US005599777A

United States Patent [19]

Jahnke et al.

[11] Patent Number: 5,599,777
[45] Date of Patent: *Feb. 4, 1997

[54] METHODS OF USING ACIDIZING FLUIDS IN WELLS, AND COMPOSITIONS USED THEREIN

[75] Inventors: Richard W. Jahnke; John W. Forsberg, both of Mentor, Ohio

[73] Assignee: The Lubrizol Corporation, Wickliffe, Ohio

[*] Notice: The term of this patent shall not extend beyond the expiration date of Pat. No. 5,260,268.

[21] Appl. No.: 132,511

[22] Filed: Oct. 6, 1993

[51] Int. Cl.$^6$ .................................................. E21B 43/27
[52] U.S. Cl. .......................... 507/244; 507/933; 166/307
[58] Field of Search .............................. 507/933, 934, 507/244; 166/307

[56] References Cited

U.S. PATENT DOCUMENTS

| | | | |
|---|---|---|---|
| Re. 30,885 | 3/1982 | Rieder | 252/34 |
| Re. 31,522 | 2/1984 | Rieder | 252/34 |
| 2,900,026 | 8/1959 | Ferdinand et al. | 166/301 |
| 3,099,624 | 7/1963 | Wilson | 507/126 |
| 3,126,970 | 3/1964 | Rygg | 175/57 |
| 3,217,802 | 11/1965 | Werlein et al. | 82/159 |
| 3,236,769 | 2/1966 | Burdyn et al. | 175/57 |
| 3,394,757 | 7/1968 | Fischer | 166/292 |
| 3,396,105 | 8/1968 | Wiener et al. | 507/133 |
| 3,601,194 | 7/1969 | Gallus | 166/283 |
| 3,806,456 | 4/1974 | Vogel | 252/51.5 A |
| 3,979,304 | 9/1976 | Fischer et al. | 507/103 |
| 3,979,305 | 9/1976 | Fischer et al. | 507/103 |
| 3,992,312 | 11/1976 | Genjida et al. | 252/77 |
| 4,101,426 | 7/1978 | Maly et al. | 507/203 |
| 4,107,061 | 8/1978 | Sturwold et al. | 252/49.3 |
| 4,133,803 | 1/1979 | Klein | 528/340 |
| 4,239,635 | 12/1980 | Rieder | 252/34 |
| 4,368,133 | 1/1983 | Forsberg | 252/75 |
| 4,374,741 | 2/1983 | Rieder | 252/34 |
| 4,379,063 | 4/1983 | Williams | 252/33.6 |
| 4,435,297 | 3/1984 | Forsberg | 252/34.7 |
| 4,436,638 | 3/1984 | Walker et al. | 507/218 |
| 4,447,348 | 5/1984 | Forsberg | 252/75 |
| 4,448,703 | 5/1984 | Forsberg | 252/75 |
| 4,464,269 | 8/1984 | Walker et al. | 507/218 |
| 4,494,610 | 1/1985 | Walker | 166/301 |
| 4,614,235 | 9/1986 | Kreener et al. | 166/301 |
| 4,659,492 | 4/1987 | Jahnke | 252/49.3 |
| 4,661,275 | 4/1987 | Forsberg et al. | 252/49.3 |
| 4,664,834 | 5/1987 | Forsberg | 252/77 |
| 4,676,916 | 6/1987 | Crema | 507/261 |
| 4,708,753 | 11/1987 | Forsberg | 149/2 |
| 4,738,797 | 4/1988 | Halpern et al. | 252/49.3 |
| 4,760,176 | 7/1988 | Halpern et al. | 562/564 |
| 4,795,581 | 1/1989 | Nieh et al. | 252/77 |
| 4,863,534 | 9/1989 | Forsberg | 149/2 |
| 4,882,075 | 11/1989 | Jones | 507/238 |
| 4,964,615 | 10/1990 | Mueller et al. | 507/243 |
| 5,260,268 | 11/1993 | Forsberg et al. | 507/133 |

FOREIGN PATENT DOCUMENTS 647309  6/1994  Australia ..................... 7/2

OTHER PUBLICATIONS

*Kirk–Othmer Encyclopedia of Chemical Technology*, 3rd ed., Wiley & Sons, New York 1981, pp. 296–303.
*Production Operations: Well Completions, Workover/and Stimulation* Chapter VII, vol. II, pp. 126–153, (1978).

Primary Examiner—Sharon Gibson
Assistant Examiner—Valerie Fee
Attorney, Agent, or Firm—John H. Englemann; David M. Shold; Frederick D. Hunter

[57] ABSTRACT

The present invention relates to a method, comprising the steps of:

introducing into a well borehole a composition, comprising water, an acid, and (A) at least one reaction product of (A-1) at least one hydrocarbyl-substituted carboxylic acylating agent selected from the group consisting of a dicarboxylic acylating agent, a succinic acylating agent, a Dieis-Alder diacid, a dimer acid acylating agent, a tricarboxylic acylating agent, a polycarboxylic acylating agent, or mixtures thereof, and (A-2) at least one amine-terminated polyoxyalkylene or (A-3) at least one hydroxy-terminated polyoxyalkylene having a number average molecular weight from about 600 to about 30,000, or a mixture of said (A-2) amine-terminated polyoxyalkylenes and (A-3) hydroxy-terminated polyoxyalkylenes. The reaction product (A) may be used alone, or in combination with one or more surfactants.

29 Claims, No Drawings

METHODS OF USING ACIDIZING FLUIDS IN WELLS, AND COMPOSITIONS USED THEREIN

FIELD OF THE INVENTION

The invention relates to a method of using water based acidizing fluids in wells. The fluids contain the reaction products of a polycarboxylic acylating agent and an amine-terminated polyoxyalkylenes, or hydroxy-terminated polyoxyalkylenes or mixtures of such amine or hydroxy-terminated polyoxyalkylenes.

INTRODUCTION TO THE INVENTION

The primary functions of an acidizing fluid is to etch rock formations in oil and gas wells and thereby increase the productivity of the well. As set forth below, an acidizing fluid contains several components in addition to the acid. Often the fluids are in the form of a gel and may include sand or other agents to maintain the channels etched by the acid. The present invention, relates to a method of using an acidizing fluid containing the reaction product of a carboxylic acylating agent and an amine-terminated polyoxyalkylene.

Re. 30,885, which is a reissue of U.S. Pat. No. 4,239,635 relates to diamides and lubricants containing the same. The carboxylic acid-terminated diamides and alkali metal, ammonium or amine salts thereof have lubricating properties and are especially useful in aqueous metalworking fluids.

Re. 31,522, which is a reissue of U.S. Pat. No. 4,374,741, relates to polyamides and functional fluids containing the same. The polyamides are polyoxyalkylene polyamides having a terminal carboxylic acid group and terminal amine group in the same molecule. The polyamides and salts thereof are useful in preparing stable aqueous based metalworking and hydraulic fluids.

U.S. Pat. No. 4,107,061 relates to amino-amide lubricants derived from polymeric fatty acids and poly(oxyethylene) diamines. These materials are readily compatible with water in all proportions and form clear, aqueous solutions which have lubricating properties.

U.S. Pat. No. 4,659,492 relates to alkenyl-substituted carboxylic agent/hydroxy-terminated polyoxyalkylene reaction products. These reaction products are useful as thickeners for water-based functional fluids, and are relatively stable for high shear applications.

U.S. Pat. No. 4,661,275 and 4,664,834 relate to hydrocarbyl-substituted succinic acid and/or anhydride/amine-terminated poly(oxyalkylene) reaction products and aqueous systems containing the same. These reaction products are useful as shear-stable thickeners for functional fluids.

U.S. Pat. No. 4,795,581 relates to aqueous fluids thickened with fatty acid modified polyoxyalkylene diamines. These materials are useful for water/glycol based hydraulic fluids, cosmetics and surfactants.

U.S. patent application Ser. No. 07/732,276 relates to drilling muds and a method of using them. These muds contain the reaction product of at least one carboxylic acylating agent and at least one amine-terminated polyoxyalkylene.

SUMMARY OF THE INVENTION

The present invention relates to a method, comprising the steps of:

introducing into a well borehole a composition, comprising water an acid, and (A) at least one reaction product of (A-1) at least one hydrocarbyl-substituted carboxylic acylating agent selected from the group consisting of a dicarboxylic acylating agent, a succinic acylating agent, a Dieis-Alder diacid, a dimer acid acylating agent, a tricarboxylic acylating agent, a polycarboxylic acylating agent, or mixtures thereof, and (A-2) at least one amine-terminated polyoxyalkylene or (A-3) at least one hydroxy-terminated polyoxyalkylene having a number average molecular weight from about 600 to about 30,000, or a mixture of said (A-2) amine-terminated polyoxyalkylenes and (A-3) hydroxy-terminated polyoxyalkylenes. The reaction product (A) may be used alone, or in combination with one or more surfactants.

DETAILED DESCRIPTION OF THE INVENTION

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-, aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon substituent; those skilled in the art will be aware of such groups (e.g., halo (especially chloro and fluoro), hydroxy, alkoxy, mercapto, alkylmercapto, nitro, nitroso, sulfoxy, etc.);

(3) hetero substituents, that is, substituents which will, while having a predominantly hydrocarbon character within the context of this invention, contain other than carbon present in a ring or chain otherwise composed of carbon atoms. Suitable heteroatoms will be apparent to those of ordinary skill in the art and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group, in which case the hydrocarbyl group would be purely hydrocarbon.

The methods and fluids of the present invention use (A) the reaction product of (A-1) a hydrocarbyl-substituted carboxylic acylating agent and (A-2) an amine-terminated polyoxyalkylene or (A-3) at least one hydroxy-terminated polyoxyalkylene having a number average molecular weight of about 600 to about 30,000, or (A-2) a mixture of said amine-terminated polyoxyalkylenes and (A-3) hydroxy-terminated polyoxyalkylenes. If the mixture of (A-2) and (A-3) is chosen, the amine-terminated and hydroxy-terminated species may be combined in any proportion.

(A-1) Hydrocarbyl-substituted Carboxylic Acylating Agent

The hydrocarbyl-substituted carboxylic acylating agents (A-1) are carboxylic acylating agents selected from the group consisting of a dicarboxylic acylating agent such as a succinic acylating agent, a Dieis-Alder diacid, a dimer acid acylating agent; a tricarboxylic acylating agent; a polycarboxylic acylating agent; or mixtures thereof. These acylating agents generally have from about 2 to about 4 carboxylic groups, preferably 2 or 3. The term acylating agents encompasses acids, anhydrides, lower esters ($C_{1-7}$ esters), halides, etc. Preferably, the acylating agents are acids or anhydrides. Carboxylic acylating agents may be di-, tricarboxylic or polycarboxylic acylating agents.

The di-, tri-, and polycarboxylic acylating agents of the present invention include dicarboxylic acylating agents such as succinic acylating agents, dimer acid acylating agents, and Dieis-Alder dicarboxylic acylating agents. Dicarboxylic acylating agents may include other hydrocarbyl-substituted diacids such as adipic and malonic acids. Tricarboxylic acylating agents include trimer acylating agents and Dieis-Alder tricarboxylic acylating agents.

The dimer acid acylating agents include products, often called dimer acids, resulting from the dimerization of unsaturated fatty acids or mixtures of such fatty acids. Examples of such fatty acids include oleic, linoleic, abietic, linolenic, octenoic acid, decenoic acid, dodecenoic acid, tetradecenoic acid, hexadecenoic acid, tall oil and rosin acids. Generally, the dimer acids have an average from about 18, preferably from about 28 to about 44, preferably to about 40 carbon atoms. In one embodiment, the dimer acids have preferably about 36 carbon atoms. The dimer acids are preferably prepared from fatty acids, such as oleic acids. The dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference. Examples of dimer acids include Empol® 1014, 1016 and 1018 Dimer Acid, each available from Henkel Corporation—Emery Group and Hystrene® dimer acids 3675, 3680, 3687 and 3695, available from Humko Chemical.

In another embodiment, the carboxylic acylating agent (A-1) is a dicarboxylic acylating agent which is the Dieis-Alder type reaction product of an unsaturated fatty acid (e.g., the above-described unsaturated fatty acids, preferably tall oil acids and oleic acids) with alpha,beta-ethylenically unsaturated carboxylic acylating agent (e.g., acrylic or methacrylic acylating agents) such as are taught in U.S. Pat. No. 2,444,328, the disclosure of which is incorporated herein by reference. These Dieis-Alder acylating agents include Westvaco® Diacid H-240, 1525 and 1550, each being commercially available from the Westvaco Corporation.

In another embodiment the carboxylic acylating agents (A-1) are hydrocarbyl-substituted succinic acylating agents, preferably acids or anhydrides, more preferably anhydrides. The hydrocarbyl group generally contains an average from about 8, preferably from about 12, more preferably from about 16 to about 40, preferably to about 28, more preferably to about 24, still more preferably to about 18 carbon atoms. Preferably, the hydrocarbyl group is an alkenyl group. The alkenyl group may be derived from one or more olefins. The olefins may be alpha-olefins, or alpha-olefins which have been isomerized to internalize the double bond. Other olefins with an internalized double bond may be used. Other olefins with an internalized double bond may be used. The olefins are preferably alpha-olefins (sometimes referred to as mono-1-olefins). Examples of the alpha-olefins include 1-octene, 1-nonene, 1-decene, 1-dodecene, 1-tridecene, 1-tetradecene, 1-pentadecene, 1-hexadecene, 1-heptadecene, 1-octadecene, 1-nonadecene, 1-eicosene, 1-henicosene, 1-docosene, 1-tetracosene, etc. Commercially available alpha-olefin fractions that can be used include the $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{16-20}$ alpha-olefins, $C_{22-28}$ alpha-olefins, etc. The $C_{16}$ and $C_{16-18}$ alpha-olefins are particularly preferred.

The succinic acylating agents are prepared by reacting the above-described olefins or isomerized olefins with unsaturated carboxylic acids such as fumaric acids or maleic acid or anhydride at a temperature of about 160° C. to about 240° C., preferably about 185° to about 210° C. Free radical initiators (e.g., t-butyl catechol) may be used to reduce or prevent the formation of polymeric byproducts. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535–537. These references are incorporated by reference for their disclosure of procedures for making the above acylating agents.

Examples of tricarboxylic acylating agents include trimer and Dieis-Alder tricarboxylic acylating agents. These acylating agents generally contain an average from about 18, preferably from about 30, more preferably from about 36 to about 66, preferably to about 60 carbon atoms. Trimer acids are prepared by the trimerization of the above-described unsaturated fatty acids. The Dieis-Alder tricarboxylic acylating agents are prepared by reacting an unsaturated monocarboxylic acid with an alpha,beta-ethylenically unsaturated dicarboxylic acid (e.g., fumaric acid or maleic acid or anhydride). In one embodiment, the Dieis-Alder acylating agent contains an average from about 12, preferably from about 18 to about 40, preferably to about 30 carbon atoms. Examples of these tricarboxylic acids include Empol® 1040 available commercially from Henkel Corporation—Emery Group, Hystrene® 5460 available commercially from Humko Chemical, and Unidyme® 60 available commercially from Union Camp Corporation.

Optionally, the carboxylic acylating agent (A-1) may contain, in addition to the di-, tri, or polycarboxylic acylating agents up to 10% by weight of a monocarboxylic acylating agent. Preferably, the carboxylic acylating agent, in this embodiment, will contain between 1 and 3% of a monocarboxylic acylating agent.

The monocarboxylic acylating agents, which may be used along with the di and tricarboxylic or polycarboxylic acylating agents include fatty carboxylic acylating agents including fatty acids and Dieis-Alder monocarboxylic reaction products. Fatty acids generally contain from about 8, preferably from about 10, more preferably from about 12 to about 30, more preferably to about 24 carbon atoms. Examples of fatty acids include stearic, oleic, lauric, linoleic, abietic, palmitic, sebacic, linolenic, behenic, tall oil and rosin acids. The monocarboxylic acylating agents may also be the reaction product of an $\alpha,\beta$-unsaturated carboxylic acid (e.g., acrylic or methacrylic acid) with one or more olefins. These olefins are the same as those listed above as possible reactants to form the hydrocarbyl-substituted succinic acylating agents.

Isomerized alpha-olefins may also be used to form Dieis-Alder reaction products. These olefins are alpha-olefins that have been converted to internal olefins. The isomerized alpha-olefins suitable for use herein are usually in the form of mixtures of internal olefins with some alpha-olefins present. The procedures for isomerizing alpha-olefins are well known to those in the art. Briefly these procedures involve contacting alpha-olefin with a cation exchange resin at a temperature in a range of about 80° to about 130° C. until the desired degree of isomerization is achieved. These procedures are described for example in U.S. Pat. No. 4,108,889 which is incorporated herein by reference.

(A-2) Amine-terminated Polyoxyalkylenes

In another embodiment, the diamines are represented by the formula

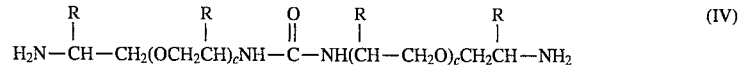

One or more of the above carboxylic acylating agents are reacted with at least one amine-terminated polyoxyalkylene. The amine-terminated polyoxyalkylenes are preferably alpha-omega amine-terminated polyoxyalkylenes. These amines include alpha-omega diamino polyoxyethylene, alpha-omega diamino polyoxypropylene-polyoxyethylene-polyoxpropylene or alpha-omega diamino propyleneoxide capped polyoxyethylene. The amine-terminated polyoxyalkylenes may also be a urea condensate of such alpha-omega diamino polyoxyalkylenes described above. The amine-terminated polyoxyalkylenes may also be polyamino species (e.g., triamino, tetramino, etc.). These compounds generally have a number average molecular weight from about 600 to about 30,000. Typically they have a number average molecular weight from about 2000, preferably from about 3000, more preferably from about 4000 to about 10,000, preferably to about 8000, more preferably to about 7000.

In one embodiment, the diamines are represented by the formula

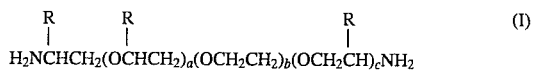

wherein each R is independently hydrogen or an alkyl group having from 1 to about 8 carbon atoms, preferably 1 to about 3, more preferably 1; a is a number in the range of from zero to about 200; b is a number in the range of from about 10 to about 650; and c is a number in the range of from zero to about 200. These diamines preferably have number average molecular weights in the range from about 600, preferably from about 1000, more preferably from about 3000, more preferably from about 4000 to about 10,000, preferably to about 7000. Specific examples of the diamines include Jeffamine® ED-600 wherein a+c is approximately 2.5 and b is approximately 8.5; Jeffamine® ED-900 wherein a+c is approximately 2.5 and b is approximately 15.5: Jeffamine® ED-2001 wherein a+c is approximately 2.5 and b is approximately 40.5; Jeffamine® ED-400 wherein a+c is approximately 2.5 and b is approximately 86.0; and ED-6000 wherein a+c is approximately 2.5 and b is approximately 131.5.

In another embodiment, the amine-terminated polyoxyalkylene is a diamine preferably amine-terminated polypropylene glycols. These diamines are represented by the formula

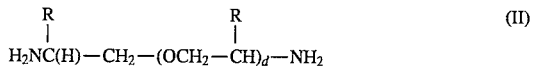

wherein R is defined above, d is from 1 to about 150, preferably 2 to about 100, more preferably 2 to about 75. Examples of these amines include Jeffamine® D-230 wherein d is about 2-3; Jeffamine® D-400 wherein d is about 5-6; Jeffamine® D-2000 wherein d is an average of about 33; and Jeffamine® D-4000 wherein d is an average of about 68. Where R is H, structure (II) becomes

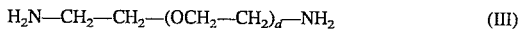

wherein R is defined above; e is a number sufficient to provide said compound with a number average molecular weight of at least about 600. These compounds preferably have number average molecular weights in the range of about 600 to about 2500, more preferably about 700 to about 2200.

In another embodiment, the amine-terminated polyoxyalkylene is a triamine prepared by treating a triol with ethylene oxide, propylene oxide, or mixtures thereof, followed by amination of the terminal hydroxyl group. These amines are available commercially from Texaco Chemical Company under the tradename Jeffamine® triamines. Examples of these amines include Jeffamine® T-403, which is trimethylolpropane treated with about 5–6 moles of propylene oxide, Jeffamine® T-3000, which is glycerine treated with 50 moles of propylene oxide, and Jeffamine® T-5,000, which is glycerine treated with 85 moles of propylene oxide.

Diamines and triamines that are useful in accordance with the present invention are disclosed in U.S. Pat. No. 3,021,232; 3,108,044; 4,444,566; and Re. 31,522. The disclosures of these patents are incorporated herein by reference for their disclosure of diamines and triamines and methods of making the same.

The above amine-terminated polyoxyalkylenes are reacted with the above polycarboxylic acylating agents at an equivalent ratio of acylating agent to amine of about (1–4:1), preferably (1–2:1), more preferably (3:2), at 125° C. to 250° C., more preferably about 150° C. to about 225° C. The reaction is usually accomplished within about two to about ten hours, more preferably about two to about six, more preferably about two to four hours.

(A-3) Hydroxy-terminated Polyoxyalkylenes

Hydroxy-terminated polyoxyalkylenes may include polyoxyalkylene glycols, polyoxyalkylene polyols, polyalkoxylated diamines, and polyalkoxylated hydrazines and the like.

The polyoxyalkylene glycols may be polyoxyethylene glycols or polyoxypropylene glycols. Useful polyoxyethylene glycols are available from Union Carbide under the trade names Carbowax® PEG 600, Carbowax® PEG 1000 and Carbowax® 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polymerized with polypropylene oxide. Useful polyoxypropylene glycols are available from Union Carbide under the trade name NIAX. Useful polyoxypropylene glycols are available from Dow Chemical and sold by the trade names PPG-1200, and PPG-2000.

Representative of other useful polyoxyalkylene polyols are the liquid polyols available from Wyandotte Chemicals Company under the name PLURONIC Polyols and other similar polyols. These PLURONIC Polyols correspond to the formula

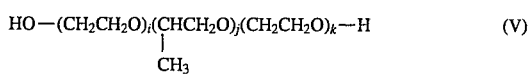

wherein i, j, and k are integers greater than 1 such that the —$CH_2CH_2O$— groups comprise from about 10% to about 15% by weight of the total number average molecular weight of the glycol, the number average molecular weight of said polyols being from about 2500 to about 4500. This type of polyol can be prepared by reacting propylene glycol with propylene oxide and then with ethylene oxide. A particularly useful polyoxyalkylene polyol is Pluracol® V-10 which is a polyoxyalkylene derivative of trimethylol propane having a molecular weight of 22,000. This material is available commercially from BASF Corporation, Parsippany, N.J., U.S.A.

Another group of polyols are the commercially available liquid TETRONIC polyols sold by Wyandotte Chemicals Corporation. These polyols are represented by the general formula:

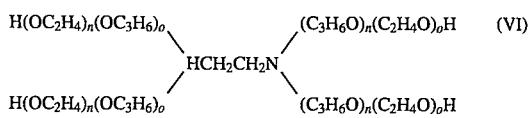

wherein n and o are integers such that the collective molecular weight of the $C_3H_6O$ chains is between about 900 to about 25,000 and the collective molecular weight of the $C_2H_4O$ chains is between about 20% to about 90% of the weight of the compound. Such hydroxyamines are described in U.S. Pat. No. 2,979,528. Those hydroxyamines corresponding to the above formula having a number average molecular weight of up to about 10,000 wherein the ethyleneoxy groups contribute to the total number average molecular weight in the percentage ranges discussed above are preferred. A specific example would be such a hydroxyamine having a number average molecular weight of about 8000 wherein the ethyleneoxy groups account for 7.5%–12% by weight of the total number average molecular weight. Such hydroxyamines can be prepared by reacting an alkylene diamine such as ethylene diamine, propylene diamine, hexamethylene diamine, etc., with propylene oxide. Then the resulting product is reacted with ethylene oxide.

The reaction product (A) of (A-1) a carboxylic acylating agent and (A-2) an amine-terminated polyoxyalkylene or (A-3) at least one hydroxy-terminated polyoxyalkylene may be used in the present invention. If an excess of the carboxylic acylating agent over the amine-terminated polyoxyalkylene is used in the formation of the reaction product, then salts of the reaction product may be formed from ammonia, amines or various metals. If the metal or other salt form of the product is available, it may be used in the present invention. However, if such a salt is used, and a strong acid is used in the acidizing fluid, the acid present in the acidizing fluid would convert the salt back to the original reaction product. If, as set forth below, an organic acid is used in forming the acidizing fluid, then the use of a salt form of the product would not be desirable since it would buffer the acid. Since the salt form of the product would not be used with an organic acid, and a mineral acid would readily convert a salt back to the product, the final acidizing fluid contains the reaction product, and not a salt thereof.

The following examples relate to reaction products (A) of the present invention. Unless otherwise indicated in the examples and elsewhere in the specification and claims, temperature is in degrees Celsius, parts are parts by weight and pressure is atmospheric.

EXAMPLE 1

A reaction vessel is charged with 12,160 parts (4 equivalents) of Jeffamine® ED-6000 (a diamine from Texaco Chemical Co. having an average molecular weight of 6000 and being a primary amine-terminated propylene oxide capped polyoxyethylene) and 2,796 parts (9.28 equivalents) of Unidyme® 60 (a trimer acid available commercially from Union Camp Corporation having 75% trimer acid, 25% dimer acid and derived from $C_{18}$ monomeric acids). A 50% aqueous solution of sodium hydroxide (258 parts, 3.22 equivalents) is added to the mixture. The mixture is stirred and heated to 150°–229° C. for four hours, while distillate containing water is removed.

EXAMPLE 2

A reaction vessel is charged with 2400 parts (1.2 moles) of Jeffamine® ED-1001 and 1611 parts (1.89 moles) of Unidyme® 60. The mixture is stirred and heated to 150° C.–200° C. for 3.7 hours, while distillate (33 milliliters) is removed.

EXAMPLE 3

A reaction vessel is charged with 3000 parts (1 equivalent) of Jeffamine® ED-6000, 412 parts (2 equivalents) of a dimer acid (commercially available from Westvaco Corporation under the tradename Westvaco dimer acid 1550). The mixture is heated under nitrogen to 154° C. in 40 minutes. The reaction is maintained between 150° C. and 200° C. for four hours while 8.5 milliliters of distillate are collected. The reaction mixture is cooled to 120° C. and the reaction temperature is maintained for 1.5 hours while 1.1 milliliters of distillate is collected. The reaction temperature is increased to 200° C while 0.1 milliliter of distillate is removed.

EXAMPLE 4

(a) 2960 parts of $C_{16}$ alpha-olefin and 100 parts of Amberlyst 15 (a product of Rohm & Haas Company identified as a cation exchange resin) are added to a five-liter flask equipped with a nitrogen sparge (2.0 standard cubic feet per hour), stirrer, thermowell and water trap positioned below a condenser. The mixture is heated to 120° C. for 1.5 hours with the stirrer operating at 350 rpm. The filtrate is the desired product.

(b) Maleic anhydride (367.5 parts) is added to a two-liter flask equipped with stirrer, thermowell, reflux condenser and gas inlet tube. The maleic anhydride is melted and 765 parts of the product from (a) are added. The mixture is heated to 180° C.–200° C. for 9.75 hours. The mixture is stripped under a vacuum of 30 mm. Hg. at 182° C., then cooled to 115° C. The mixture is then stripped under vacuum of 0.7 mm. Hg. at 145° C., then cooled to 50° C. The mixture is filtered with diatomaceous earth. The filtrate is the desired product.

(c) One hundred parts of Jeffamine® ED-6000 and 10.8 parts of the product from (b) are mixed together, heated at a temperature of 130° C. for three hours, and then cooled to room temperature to provide the desired product.

EXAMPLES 5–7

The following Table 1 contains examples which are prepared by the procedure described in Example 1.

TABLE 1

| Example | Amine-terminated Polyoxyalkylene (parts) | Acylating Agent (parts) |
|---|---|---|
| Ex. 5 | 900 Jeffamine ® ED-900 | 85 Unidyme ® 60 |
| Ex. 6 | 4000 Jeffamine ® ED-4000 | 504 hexadecenyl succinic anhydride |
| Ex. 7 | 5000 Jeffamine ® T-5000 | 857 Unidyme ® 60 |

EXAMPLE 8

A reaction vessel is charged with 306 parts of $C_{16-18}$ substituted succinic anhydride, and 473 parts of polyethylene glycol of average MW 900 (CARBOWAX 900) is added to the vessel. The mixture is stirred and heated to 120° C. for 3 hours. The mixture is cooled to room temperature to provide the desired product.

EXAMPLE 9

A reaction vessel is charged with 306 parts of $C_{16-18}$ substituted succinic anhydride, and 473 parts of polyoxyalkylene diamine (JEFFAMINE ED-900) is added to the vessel. The mixture is stirred and heated to 120° C. for 3 hours. The mixture is cooled to room temperature to provide the desired product.

EXAMPLE 10

A reaction vessel is charged with 51.2 parts of propylene tetramer substituted succinic anhydride, and 203.5 parts of polyoxyalkylene polyol (PLURONIC L-43) is added to the vessel. The mixture is stirred and heated to 80° C. for 8 hours. The mixture is cooled to room temperature to provide the desired product.

EXAMPLE 11

A reaction vessel is charged with 38.4 parts of propylene tetramer substituted succinic anhydride, and 160 parts of polyoxyalkylene polyol (PLURONIC L-61) is added to the vessel. The mixture is stirred and heated to 100° C. for 3 hours. The mixture is cooled to room temperature to provide the desired product.

EXAMPLE 12

A reaction vessel is charged with 39.7 parts of propylene tetramer substituted succinic anhydride, and 160 parts of polyoxyalkylene polyol (PLURONIC 10R5) is added to the vessel. The mixture is stirred and heated to 110° C. for hours. The mixture is cooled to room temperature to provide the desired product.

EXAMPLE 13

A reaction vessel is charged with 36.9 parts of propylene tetramer substituted succinic anhydride, and 161 parts of polyoxyalkylene polyol (PLURONIC 17R2) is added to the vessel. The mixture is stirred and heated to 100° C. for 3.5 hours. The mixture is cooled to room temperature to provide the desired product.

EXAMPLE 14

A reaction vessel is charged with 102 parts of propylene tetramer substituted succinic anhydride, and 700 parts of polyoxyalkylene polyol (PLURONIC L-10) is added to the vessel. The mixture is stirred and heated to 100° C. for 2.5 hours. The mixture is cooled to room temperature to provide the desired product.

EXAMPLE 15

A reaction vessel is charged with 128 parts of propylene tetramer substituted succinic anhydride, and 560 parts of polyoxyalkylene polyol (PLURONIC L-35) is added to the vessel. The mixture is stirred and heated to 100° C. for 2.5 hours. The mixture is cooled to room temperature to provide the desired product.

EXAMPLE 16

A reaction vessel is Charged with 97.3 parts of propylene tetramer substituted succinic anhydride, and 530 parts of polyoxyalkylene polyol (PLURONIC 17R4) is added to the vessel. The mixture is stirred and heated to 100° C. for 3 hours. The mixture is cooled to room temperature to provide the desired product.

EXAMPLE 17

A reaction vessel is charged with 256 parts of propylene tetramer substituted succinic anhydride, and 412.5 parts of ethoxylated diamine (TETRONIC 304) is added to the vessel. The mixture is stirred and heated to 60° C. for 2 hours. The mixture is cooled to room temperature to provide the desired product.

EXAMPLE 18

A reaction vessel is charged with 282 parts of propylene tetramer substituted succinic anhydride, and 900 parts of ethoxylated diamine (TETRONIC 701) is added to the vessel. The mixture is stirred and heated to 40° C. for 2 hours. The mixture is cooled to room temperature to provide the desired product.

EXAMPLE 19

A reaction vessel is charged with 156 parts of propylene tetramer substituted succinic anhydride, and 825 parts of ethoxylated diamine (TETRONIC 704) is added to the vessel. The mixture is stirred and heated to 45° C. for 2 hours. The mixture is cooled to room temperature to provide the desired product.

EXAMPLE 20

A reaction vessel is charged with 125 parts of propylene tetramer substituted succinic anhydride, and 869 parts of ethoxylated diamine (TETRONIC 90R4) is added to the vessel. The mixture is stirred and heated to 45° C. for 3 hours. The mixture is cooled to room temperature to provide the desired product.

EXAMPLE 21

A reaction vessel is charged with 112.6 parts of propylene tetramer substituted succinic anhydride, and 880 parts of ethoxylated diamine (TETRONIC 150R1) is added to the vessel. The mixture is stirred and heated to 45° C. for 2 hours. The mixture is cooled to room temperature to provide the desired product.

(B) Surfactants

The acylated amine-terminated polyoxyalkylenes or hydroxyl-terminated polyoxyalkylenes, i.e, reaction product (A), may be used alone or in combination with (B) one or more surfactants. The combination of the acylated amine-terminated polyoxyalkylene or a hydroxyl-terminated polyoxyalkylene and one or more surfactants gives improved thickening, wetting and emulsifying properties to fluids. The combination usually contains from about 5%, preferably from about 15%, more preferably from about 25%, more preferably from about 50% to about 95%, preferably to about 85%, more preferably to about 75% of the acylated amine-terminated polyoxyalkylene or hydroxyl-terminated polyoxyalkylene. The combination usually contains from about 5%, preferably from about 10%, more preferably from about 20% to about 90%, preferably to about 75%, more preferably to about 50% by weight of the surfactant. The surfactants include nonionic, cationic and anionic surfactants. Molecules which may be used as the (A-2) reactant to form the (A) component of the inventive composition, may be used in unreacted state as part of the (B) component. The two uses of the same molecule are distinguishable since the (A-2) component is reacted with the (A-1) component while the (B) component is not. If an (A) component is formed in a reaction which includes an excess of the (A-2) component, the unreacted excess of the (A-2) component would serve as a (B) component surfactant.

In addition to the (A-2) components, the surfactants may include alkyl-terminated polyoxyalkylene polyols, polyoxyalkylene esters, polyoxyalkylene phenols, polyoxyalkylene ethers, fatty polyamine diamines, and fatty acid salts or mixtures of these surfactants. Any of the above-described polyoxyalkylene amines, including amine-terminated polyoxyalkylenes and hydroxyamines may be used as surfactants in the present invention. These hydroxyamines can be represented by the formula

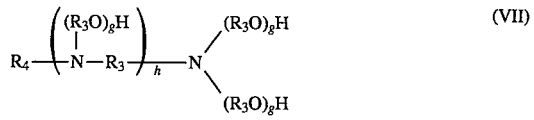

(VII)

wherein each $R_3$ is an alkylene group; $R_4$ is a hydrocarbyl group; g is independently an integer from zero to 100, provided at least one g is an integer greater than zero; and h is zero or one.

Preferably, $R_4$ is a hydrocarbyl group having from 8 to about 30 carbon atoms, preferably 8 to about 24, more preferably 10 to about 18 carbon atoms. $R_4$ is preferably an alkyl or alkenyl group, more preferably an alkenyl group. $R_4$ is preferably an octyl, decyl, dodecyl, tridecyl, tetradecyl, hexadecyl, octadecyl, oleyl, tallow or soya.

g is preferably one to about 100, more preferably 2 to about 50, more preferably 2 to about 20, more preferably 3 to about 10, more preferably about 5.

$R_3$ is as described above. Preferably, each $R_3$ is independently an ethylene or propylene group.

The above hydroxyamines can be prepared by techniques well known in the art, and many such hydroxyamines are commercially available. They may be prepared, for example, by reaction of primary amines with various amount of alkylene oxides such as ethylene oxide, propylene oxide, etc. The primary amines may be single amines or mixtures of amines. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

The useful hydroxyamines where h in the above formula (VII) is zero include 2-hydroxyethylhexylamine, 2-hydroxyethyloctylamine, 2-hydroxyethylpentadecylamine, 2-hydroxyethyloleylamine, 2-hydroxyethylsoyaamine, bis(2-hydroxyethyl)hexylamine, bis(2-hydroxyethyl)oleylamine, and mixture thereof. Also included are the comparable members wherein in the above formula at least one g is an integer greater than 1, as for example, 2-hydroxyethoxyethylhexylamine.

A number of hydroxyamines wherein h is zero are available from the Armak Chemical Division of Akzona, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen 0/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively. "Propomeen 0/12" is the condensation product of one mole of oleylamine with 2 moles propylene oxide.

Commercially available examples of hydroxyamines where h is one include "Ethoduomeen T/13" and "T/20" which are ethylene oxide condensation products of N-tallow trimethylene diamine containing 3 and 10 moles of ethylene oxide per mole of diamine, respectively.

The alkyl-terminated polyoxyalkylene polyols useful as surfactants in the present invention are available commercially under such trade names as "TRITON®" from Rohm & Haas Company, "Carbowax®" and "TERGITOL®" from Union Carbide, "ALFONIC®" from Conoco Chemicals Company, and "NEODOL®" from Shell Chemical Company. The TRITON® materials are identified generally as polyethoxylated alcohols or phenols. The TERGITOLS® are identified as ethoxylated linear alcohols which may be represented by the general structural formula

(VIII)

wherein l varies between 5 and 17 and m is a number between about 3 and 11. Specific examples of ALFONIC® ethoxylates characterized by the above formula include ALFONIC® 1012–60 wherein l is about 8 to 10 and m is an average of about 5 to 6; ALFONIC® 1214–70 wherein l is about 10–12 and m is an average of about 10 to about 11; ALFONIC® 1412–60 wherein l is from 10–12 and m is an average of about 7; and ALFONIC® 1218–70 wherein l is about 10–16 and m is an average of about 10 to about 11.

The Carbowax® methoxy polyethylene glycols are linear ethoxylated polymer of methanol. Examples of these materials include Carbowax® methoxy polyethylene glycol 350, 550 and 750, wherein the numerical value approximates number average molecular weight.

The fatty alkyl diamines, usable as surfactants, include mono- or dialkyl, symmetrical or asymmetrical ethylene diamines, propane diamines (1,2 or 1,3), and polyamine analogs of the above. Suitable commercial fatty polyamines are "Duomeen C" (N-coco-1,3-diaminopropane), "Duomeen S" (N-soya-1,3-diaminopropane), "Duomeen T" (N-tallow-1,3-diaminopropane), or "Duomeen 0" (N-oleyl-1,3-diaminopropane). "Duomeens" are commercially available diamines described in Product Data Bulletin No. 7-10R1 of Armak Chemical Co., Chicago, Ill. In another embodiment, the secondary amines may be cyclic amines such as piperidine, piperazine, morpholine, etc.

In another embodiment, the surfactant may be an ethyoxylated primary alcohol. For example, NEODOL® ethoxylates, which are usable as surfactants in the present invention, are ethoxylated alcohols wherein the alcohols are a mixture of alcohols containing from 12 to about 15 carbon atoms, and the alcohols are partially branched chain primary alcohols. The ethyoxylates are obtained by reacting the alcohols with an excess of ethylene oxide such as from about 3 to about 12 or more moles of ethylene oxide per mole of alcohol. For example, NEODOL® ethoxylate 23–6.5 is a partially branched chain alcoholate of 12 to 13 carbon atoms with an average of about 6 to about 7 ethoxy units.

In another embodiment the surfactant is an alkyl-terminated polyoxyalkylene. A variety of alkyl-terminated polyoxyalkylenes are known in the art, and many are available commercially. The alkyl-terminated polyoxyalkylenes are produced generally by treating an aliphatic alcohol with an excess of an alkylene oxide such as ethylene oxide or propylene oxide. For example, from about 6 to about 40 moles of ethylene oxide or propylene oxide may be condensed with the aliphatic alcohol.

In another embodiment, the surfactant is a polyoxyalylated phenol. The phenol may be substituted or unsubstituted. A preferred polyoxyalkylated phenol is a polyoxyethylate nonylphenol. Polyoxyalkylated phenols are available commercially from Rohm and Haas Co. under the tradename Triton® and Texaco Chemical Company under the tradename Surfonic® Examples of polyoxyalkylated phenols include Triton® AG-98, N series, and X series polyoxyethylated nonylphenols.

In another embodiment, the surfactant is a polyoxyalkylene fatty ester. Polyoxyalkylene fatty esters may be prepared from any polyoxyalkylene polyol and a fatty acid. The polyoxyalkylene polyol may be any polyol disclosed above. Preferably, the polyol contains between 5 and 25 oxyalkylene units. The fatty acid is preferably the fatty monocarboxylic acid containing from 4 to 22 carbon atoms. Polyoxyalkylene fatty esters are available commercially from Armak Company under the tradename Ethofat™. Specific examples of polyoxyalkylene fatty esters include Ethofat™ C/15 and C/25, which are coco fatty esters formed using 5 and 15 moles, respectively, of ethylene oxide; Ethofat™ 0/15 and 0/20, which are oleic esters formed using 5 and 10 moles of ethylene oxide; and Ethofat 60/15, 60/20 and 60/25 which are stearic esters formed with 5, 10 and 15 moles of ethylene oxide respectively.

In a preferred embodiment, the surfactant is a tall oil, such as distilled tall oil available from Union Camp under the tradename Unitol.

In another embodiment, the surfactant is a nitrogen-containing phosphorus-free reaction product of a carboxylic acylating agent, preferably a succinic acylating agent, having at least one hydrocarbyl group from at least about 12, preferably from about 30, more preferably from about 35 to about 500, preferably to about 300 carbon atoms with at least one N-(hydroxyhydrocarbyl)amine (this species is not an amine-terminated polyoxyalkylene). In one embodiment, the hydrocarbyl group is derived from a polyalkene having a number average molecular weight from about 500, preferably from about 800 to about 5000, preferably to about 2500, more preferably to about 1200. Number average molecular weight is determined by gel permeation chromatography. The polyalkene is derived from olefins having from about 2 to about 8 carbon atoms, such as ethylene, propylene or butylene, preferably butylene. The amine may be a monamine, polyamine or mixtures thereof. The carboxylic acid acylating agents have been described above as well as the hydroxyamines.

Particularly useful hydroxyhydrocarbyl amines include mono, di and triethanolamine, diethyl ethanolamine, di(3-hydroxylpropyl)amine, N-(3-hydroxylbutyl)amine, N-(4-hydroxylbutyl)amine, N,N-di(2-hydroxylpropyl)amine, N-(2-hydroxylethyl)morpholine and its thioanalogue, N-(2-hydroxylethyl)cyclohexyl amine, N-(3-hydroxylcyclopentyl amine, o-, m- and p-aminophenol, N-(hydroxylethyl)piperazine, N,N'-di(hydroxyethyl)piperazine, and the like. Preferred amines are diethylethanolamine and ethanolamine or mixtures thereof.

Often the reaction of the succinic acylating agent and the hydroxyhydrocarbyl amine to form the surfactant is carried out under ester-forming conditions, and the product thus formed is an ester/salt. Preferably, the ester/salt is an internal salt, wherein one of the carboxyl groups of the carboxylic acylating agents becomes ionically bonded to a nitrogen atom within the same group or may be an external salt wherein the ionic salt group is formed with a nitrogen atom which is not part of the same group forming the ester. Generally, the reaction is carried out at a temperature in the range of about 50° C. to about 150° C.; but usually at a temperature below 100° C.

The reaction products made by reacting a carboxylic acylating agent and a hydroxyl amine which are useful surfactants are described in U.S. Pat. Nos. 4,329,249; 4,368,133; 4,435,297; 4,447,348; and 4,448,703. These patents are incorporated by reference for their disclosure to the reaction products of carboxylic acylating agents and hydroxyamines as well as methods for making the same.

The following example relates to ester/salts which may be used as surfactants in the present invention.

EXAMPLE 22

A reaction vessel is charged with 1000 parts of polybutene (number average molecular weight equals 950) substituted succinic anhydride. The anhydride is heated to about 90° C. over two hours where 209 parts of N,N-diethylethanolamine is added to the vessel. The reaction temperature is maintained at 90° C. for an additional hour. The mixture is cooled to room temperature to provide the desired surfactant product.

Acidizing Fluid

The reaction products (A) of the present invention are used together with other components to prepare a water-based acidizing fluid. The acidizing fluid according to the present invention is compose of water, an acid, and (A) at least one reaction product of (A-1) at least one carboxylic acylating agent and (A-2) at least one amine-terminated polyoxyalkylene or (A-3) at least one hydroxy-terminated polyoxyalkylene having a number average molecular weight from about 600 to about 30,000, or a mixture of said (A-2) amine-terminated polyoxyalkylenes and (A-3) hydroxy-terminated polyoxyalkylenes. The acid is selected based upon cost, the type of rock formation to be etched, and the nature of the metal components in the well. Acidizing fluids are often used in the form of gels. Sand is often included as a proppant to maintain the channels etched by the acid. If proppants are not used, the pressure at the bottom of the well may cause the channels to close. Occasionally, acidizing fluids are used under a pressure sufficient to cause fracturing.

This technique is referred to as acid fracturing and involves both pressure fracturing and acid etching. The use of acidizing fluids, inclusion of proppants, and the selection of the acid to be used are all well known to those skilled in the art. A wide variety of mineral and organic acids may be used in acidizing fluids. Commonly used acids include hydrochloric, hydrofluoric, acetic, formic, sulfamic, fluoroboric and mixtures of these acids. The use of acidizing fluids is discussed in *Production Operations*, Vol. 2—Well Completion, Workover and Stimulation, Thomas O. Allen & Alan P. Roberts, Oil and Gas Consultants International, Inc., Copyright 1978, 1982, & 1989, Chapter 7, pp. 125–153.

The (A) reaction product may be used alone or in combination with one or more of the above-described surfactants. The (A) reaction product is generally added to the acidizing fluid as a concentrate. Typically, the concentrates contain at least about 30% by weight of (A) based on the total composition weight, preferably at least about 35%. In one embodiment, the concentrates contain from about 30%, preferably from about 40% to about 80%, preferably to about 70% by weight of the (A) reaction product based on the total weight of the concentrate. The concentrate may contain only the (A) reaction product or may additionally contain one or more of the above-described surfactants.

When used in an acidizing fluid, the (A) reaction product is generally added to the acidizing fluid at a level of about 0.5% to about 15% by weight concentrate in the acidizing fluid. Typically, the (A) reaction product is used from about 0.5% to about 5%, preferably 2% by weight of the acidizing fluid.

The following examples relate to acidizing fluids which may be prepared according to the present invention.

EXAMPLES I–X

The following table illustrates gels which were prepared using the material of Example 1 and various surfactants. The table shows the proportion by weight of the product of Example 1, water and the surfactant which were mixed together. In each case, the three components were mixed, heated in a steam cone for 20–25 minutes and stirred for 3–5 minutes to form a gel. These gels are suitable for the preparation of acidizing fluids according to the present invention.

TABLE 2

|  | I | II | III | IV | V | VI | VII | VIII | IX | X |
|---|---|---|---|---|---|---|---|---|---|---|
| Product of Ex. 1 | 40 | 40 | 40 | 40 | 40 | 40 | 40 | 40 | 40 | 40 |
| SURFACTANT |  |  |  |  |  |  |  |  |  |  |
| Ethomeen O/15 | 20 |  |  |  |  |  |  |  |  |  |
| Ethomeen 18/15 |  | 20 |  |  |  |  |  |  |  |  |
| Ethomeen S/15 |  |  | 20 |  |  |  |  |  |  |  |
| Ethofat O/20 |  |  |  | 20 |  |  |  |  |  |  |
| Ethomeen C/15 |  |  |  |  | 20 |  |  |  |  |  |
| Ethomeen C/20 |  |  |  |  |  | 20 |  |  |  |  |
| Ethomid O/15 |  |  |  |  |  |  | 20 |  |  |  |
| Condensate CO |  |  |  |  |  |  |  | 20 |  |  |
| Ethomeen C/25 |  |  |  |  |  |  |  |  | 20 |  |
| Ethomeen T/25 |  |  |  |  |  |  |  |  |  | 20 |
| Water (tap) | 40 | 40 | 40 | 40 | 40 | 40 | 40 | 40 | 40 | 40 |

ETHOMEEN, ETHOFAT, AND ETHOMID are trademarks of Armak Chemical
CONDENSATE CO is a trademark of the GAF Corp.
ETHOMEEN O/15 is an ethoxylated oleylamine containing 5 moles of ethylene oxide TABLE 2-continued

|  | I | II | III | IV | V | VI | VII | VIII | IX | X |
|---|---|---|---|---|---|---|---|---|---|---|

ETHOMEEN 18/15 is an ethoxylated octadecylamine containing 5 moles of ethylene oxide
ETHOMEEN C/15 is an ethoxylated cocoalkylamine containing 10 moles of ethylene oxide
ETHOMEEN C/20 is an ethoxylated cocoalkylamine containing 10 moles of ethylene oxide
ETHOMEEN C/25 is an ethoxylated cocoalkylamine containing 15 moles of ethylene oxide
ETHOMEEN T/25 is an ethoxylated tallowalkylamine containing 15 moles of ethylene oxide
ETHOFAT O/20 is an ethoxylated oleic acid containing 10 moles of ethylene oxide
ETHOMID O/15 is an ethoxylated oleylamide containing 5 moles of ethylene oxide
CONDENSATE CO is a alkoxylated cocoalkylamine

EXAMPLES XI–XV

The following table illustrates acidizing fluids in the form of gels which were prepared using the material of III in Tables 2 and 4N hydrochloric acid in various proportions. The table shows the weight of the product of Example 9 and 4N hydrochloric acid which were mixed to form a gel. The gel was heated on a steam cone for 1–2 hours to form a clear dark-colored homogeneous gel. After 4–6 hours of heating at about 70° C. the gel reverted to a clear amber fluid. The clear amber fluid which was produced from the gel containing 7 grams of the product of Example 9 and 93 grams of 4N hydrochloric acid (XI) was stable for at least 4 months at about 70° C. It remained clear and did not separate into two phases.

TABLE 3

|  | XI | XII | XIII | XIV | XV |
|---|---|---|---|---|---|
| GRAMS OF THE PRODUCT III (Table 2) | 7 | 6 | 5 | 4 | 3 |
| GRAMS of 4 N HCl | 93 | 94 | 95 | 96 | 97 |

We claim:

1. A method, comprising the step of: introducing into a well borehole a composition, comprising water, an acid, and (A) at least one reaction product of (A-1) at least one hydrocarbyl-substituted carboxylic acylating agent selected from the group consisting of a dicarboxylic acylating agent, a tricarboxylic acylating agent, a polycarboxylic acylating agent, or mixtures thereof, and (A-2) at least one amine-terminated polyoxyalkylene.

2. The method of claim 1, wherein the hydrocarbyl group of (A-1) contains an average of about 8 to about 40 carbon atoms.

3. The method of claim 1, wherein the carboxylic acylating agent (A-1) is an alkenylsuccinic acid or anhydride having an average of about 12 to about 28 carbon atoms in the alkenyl group.

4. The method of claim 1, wherein the carboxylic acylating agent (A-1) is a dimer acid having an average of about 18 to about 44 carbon atoms.

5. The method of claim 1, wherein the carboxylic acylating agent (A-1) is a tricarboxylic acylating agent containing an average of about 18 to about 66 carbon atoms.

6. The method of claim 1, wherein the amine-terminated polyoxyalkylene (A-2) has a number average molecular weight from about 3,000 to about 7,000.

7. The method of claim 1, wherein the amine-terminated polyoxyalkylene (A-2) is represented by the formulae:

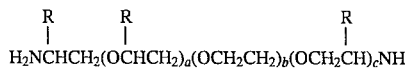 (I)

or

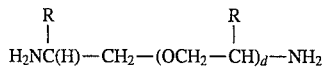 (II)

or $$H_2N-CH_2-CH_2-(OCH_2-CH_2)_d-NH_2 \quad (III)$$

or

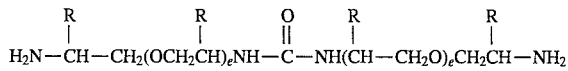 (IV)

wherein R is an alkyl group having from 1 to about 8 carbon atoms, a is an average number in the range from 0 to about 200, b is an average number in the range from about 10 to about 650, c is an average number in the range from 0 to about 200, d is an average number in the range from 1 to about 150, and e is a number sufficient to provide the compound with a number average molecular weight of at least about 600.

8. The method of claim 1, wherein the composition further comprises (B) at least one surfactant.

9. The method of claim 8, wherein the surfactant (B) is at least one amine-terminated polyoxyalkylene, hydroxyl-terminated polyoxyalkylene, alkyl-terminated polyoxyalkylene polyol, polyoxyalkylene ester, polyoxyalkylene phenol, polyoxyalkylene ether, hydroxyamine, or fatty acid or salt thereof.

10. The method of claim 8, wherein the surfactant (B) is a hydroxyl-terminated polyoxyalkylene.

11. The method of claim 8, wherein the surfactant (B) is a hydroxyamine.

12. The method of claim 8, wherein the surfactant (B) is a reaction product of a succinic acylating agent and at least one N-(hydroxyhydrocarbyl)amine.

13. The method of claim 1, wherein the reaction product (A) is present in an amount from about 0.5% to about 15% by weight of the compositions.

14. The method according to claim 1 wherein the carboxylic acylating agent (A-1) further comprises up to 10% of a monocarboxylic acid.

15. A method, comprising the step of: introducing into a well borehole a composition comprising water, an acid, and from about 0.5% to about 15% by weight of the composition (A) at least one reaction product of (A-1) at least one hydrocarbyl-substituted carboxylic acylating agent selected from the group consisting of a dicarboxylic acylating agent, a tricarboxylic acylating agent, a polycarboxylic acylating agent, or mixtures thereof, and (A-2) at least one amine-terminated polyoxyalkylene.

16. The method of claim 15, wherein the carboxylic acylating agent (A-1) is an alkenylsuccinic acid or anhydride having an average of about 12 to about 28 carbon atoms in the alkenyl group.

17. The method of claim 15, wherein the carboxylic acylating agent (A-1) is a trimer acid containing an average of about 18 to about 66 carbon atoms.

18. The method of claim 15, wherein the amine-terminated polyoxyalkylene (A-2) has a number average molecular weight from about 3000 up to about 7000.

19. The method of claim 15, wherein the composition further comprises (B) at least one surfactant.

20. The method of claim 19, wherein the surfactant (B) is at least one amine-terminated polyoxyalkylene, hydroxyl-terminated polyoxyalkylene phenol, alkyl-terminated polyoxyalkylene polyoxyalkylene ester, polyoxyalkylene phenol, polyoxyalkylene ether, hydroxyamine, of fatty acid of salt thereof.

21. The method according to claim 15 wherein the carboxylic acylating agent (A-1) further comprises up to 10% of a monocarboxylic acid.

22. A water-based acidizing fluid comprising an acid and (A) at least one reaction product of (A-1) at least one hydrocarbyl-substituted carboxylic acylating agent selected from the group consisting of a succinic acylating agent, a Dieis-Alder diacid, a dicarboxylic acylating agent, a tricarboxylic acylating agent, or mixtures thereof, and (A-2) at least one amine-terminated polyoxyalkylene.

23. The composition of claim 22, wherein the carboxylic acylating agent (A-1) contains an average of about 8 to about 40 carbon atoms.

24. The composition of claim 22, wherein the carboxylic acylating agent (A-1) is an alkenyl succinic acid or anhydride having an average of about 12 to about 28 carbon atoms in the alkenyl group.

25. The composition of claim 22, wherein the carboxylic acylating agent (A-1) is a tricarboxylic acylating agent containing an average of about 18 to about 66 carbon atoms.

26. The composition of claim 22, wherein the amine-terminated polyoxyalkylene (A-2) has a number average molecular weight from about 3000 to about 7000.

27. The composition of claim 22, wherein the composition further comprises (B) at least one surfactant.

28. The composition of claim 22, wherein the surfactant (B) is at least amine-terminated polyoxyalkylene, hydroxyl-terminated polyoxyalkylene, alkyl-terminated polyoxyalkylene polyol, polyoxyalkylene ester, polyoxyalkylene phenol, polyoxyalkylene ether, hydroxyamine or fatty acid or salt thereof.

29. An acidizing fluid according to claim 22 wherein the carboxylic acylating agent (A-1) further comprises up to 10% of a monocarboxylic acid.

* * * * *